(12) United States Patent
Rundle et al.

(10) Patent No.: US 9,785,185 B2
(45) Date of Patent: Oct. 10, 2017

(54) REMOVABLE ADHESIVE JOINT FOR COMPUTING DEVICE

(75) Inventors: Nicholas Alan Rundle, San Jose, CA (US); David Phillip Tarkington, Sunnyvale, CA (US); Michelle Goldberg, Sunnyvale, CA (US); Matthew Casebolt, Fremont, CA (US); Robert Sean Murphy, Sunnyvale, CA (US); James R. Krogdahl, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 596 days.

(21) Appl. No.: 13/610,727

(22) Filed: Sep. 11, 2012

(65) Prior Publication Data

US 2014/0072794 A1 Mar. 13, 2014

(51) Int. Cl.
*B32B 7/12* (2006.01)
*G06F 1/16* (2006.01)
*C09J 7/02* (2006.01)

(52) U.S. Cl.
CPC .......... *G06F 1/1601* (2013.01); *C09J 7/0296* (2013.01); *G06F 1/1637* (2013.01); *C09J 2201/36* (2013.01); *G06F 2200/1631* (2013.01); *Y10T 29/49817* (2015.01); *Y10T 83/04* (2015.04); *Y10T 156/10* (2015.01); *Y10T 428/249983* (2015.04)

(58) Field of Classification Search
CPC .... G06F 1/1601; C09J 7/0296; C09J 2201/36
See application file for complete search history.

(56) References Cited

U.S. PATENT DOCUMENTS

| 4,879,450 A | 11/1989 | Valentin et al. |
| 5,893,959 A | 4/1999 | Muellich |
| 6,451,398 B1 | 9/2002 | Sylvester |
| 6,501,044 B1 | 12/2002 | Klockhaus et al. |

(Continued)

FOREIGN PATENT DOCUMENTS

| CN | 1757468 | 4/2006 |
| CN | 101088961 | 12/2007 |

(Continued)

OTHER PUBLICATIONS

Translation of JP 2003-253228. See above for date and inventor.*

(Continued)

*Primary Examiner* — Victor Chang
(74) *Attorney, Agent, or Firm* — Kendall W. Abbasi; David K. Cole

(57) ABSTRACT

Examples of computing devices including a processor, memory, and a display device housed within the same enclosure are described. In examples, the display device, which may include a cover glass, may be attached to the enclosure using a multilayer adhesive member, the multilayer adhesive including a first adhesive layer and a second adhesive layer disposed on opposite sides of a foam layer. The first and/or second adhesive layers may include two or more layers of a pressure sensitive adhesive (PSA), which may be separated using one or more adhesive carrier films. In examples, the first and/or second adhesive layers may include a low tack (e.g. removable) PSA for adhering to surfaces of the display and enclosure and for facilitation removal and re-workability of the adhesive joint.

14 Claims, 7 Drawing Sheets

(56) References Cited

U.S. PATENT DOCUMENTS

| | | |
|---|---|---|
| 6,627,814 B1 | 9/2003 | Stark |
| 6,670,021 B2 | 12/2003 | Schroder et al. |
| 6,767,624 B2 | 7/2004 | Bronstert |
| 7,635,516 B2 | 12/2009 | Arimitsu et al. |
| 7,776,437 B2 | 8/2010 | Kim |
| 7,811,647 B2 | 10/2010 | Arimitsu et al. |
| 7,910,206 B2 | 3/2011 | Kiuchi et al. |
| 8,060,168 B2 | 11/2011 | Horrdin et al. |
| 8,153,250 B2 | 4/2012 | Nakayama et al. |
| 8,570,729 B2 | 10/2013 | Prest et al. |
| 8,787,980 B2 | 7/2014 | Hashimoto et al. |
| 8,852,330 B2 | 10/2014 | Naess et al. |
| 8,986,844 B2 | 3/2015 | Jeon et al. |
| 9,149,998 B2 | 10/2015 | Vienonen et al. |
| 2002/0132079 A1* | 9/2002 | Woods .................. 428/41.7 |
| 2003/0071269 A1 | 4/2003 | Tseng |
| 2004/0022046 A1* | 2/2004 | Leerkamp .............. H05K 9/003 361/816 |
| 2004/0237422 A1 | 12/2004 | Tat et al. |
| 2009/0054115 A1* | 2/2009 | Horrdin ................ G06F 1/1616 455/575.8 |
| 2009/0128912 A1 | 5/2009 | Okada |
| 2009/0181194 A1 | 7/2009 | Zhang et al. |
| 2010/0252185 A1 | 10/2010 | Kiuchi et al. |
| 2010/0279491 A1 | 11/2010 | Kiuchi et al. |
| 2011/0019351 A1* | 1/2011 | Bayne ............... G02F 1/133308 361/679.01 |
| 2012/0099259 A1 | 4/2012 | Park |
| 2012/0170244 A1 | 7/2012 | Kwon et al. |
| 2012/0244343 A1 | 9/2012 | Stiehl |
| 2013/0034676 A1 | 2/2013 | Casebolt |
| 2013/0034727 A1 | 2/2013 | Casebolt |
| 2013/0162891 A1 | 6/2013 | Wang |
| 2014/0139978 A1 | 5/2014 | Kwong |
| 2014/0192467 A1 | 7/2014 | Kwong |
| 2015/0280767 A1 | 10/2015 | Ames et al. |
| 2016/0066448 A1 | 3/2016 | Nazzaro et al. |

FOREIGN PATENT DOCUMENTS

| | | | |
|---|---|---|---|
| CN | 101634186 | | 1/2010 |
| CN | 101693629 | | 4/2010 |
| CN | 101815594 | | 8/2010 |
| CN | 201804749 | | 4/2011 |
| EP | 1270183 | | 11/2003 |
| JP | 56005363 | | 1/1981 |
| JP | 8213928 | | 8/1996 |
| JP | 2003253228 A | * | 9/2003 |
| JP | 2003320585 | | 11/2003 |
| JP | 2006141152 | | 6/2006 |
| JP | 201107056 | | 10/2011 |
| JP | 201495515 | | 5/2014 |
| TW | 200307310 | | 11/2004 |
| TW | 200812807 | | 3/2008 |
| TW | 200915869 | | 4/2009 |
| TW | 201214238 | | 4/2012 |
| WO | WO2006/048500 | | 5/2006 |
| WO | WO2006/090003 | | 8/2006 |

OTHER PUBLICATIONS

Invitation to Pay Additional Fees, PCT Application No. PCT/US2013/059252, 5 pages, dated Mar. 4, 2014.
International Search Report and Written Opinion, PCT Application No. PCT/US2013/059252, 15 pages, dated May 12, 2014.
"Laserstrahlschweissen von Thermoplasten im Durchstrahlverfahren," Technische Information Fuer Experten, pp. 1-8, Feb. 1, 2000.

* cited by examiner

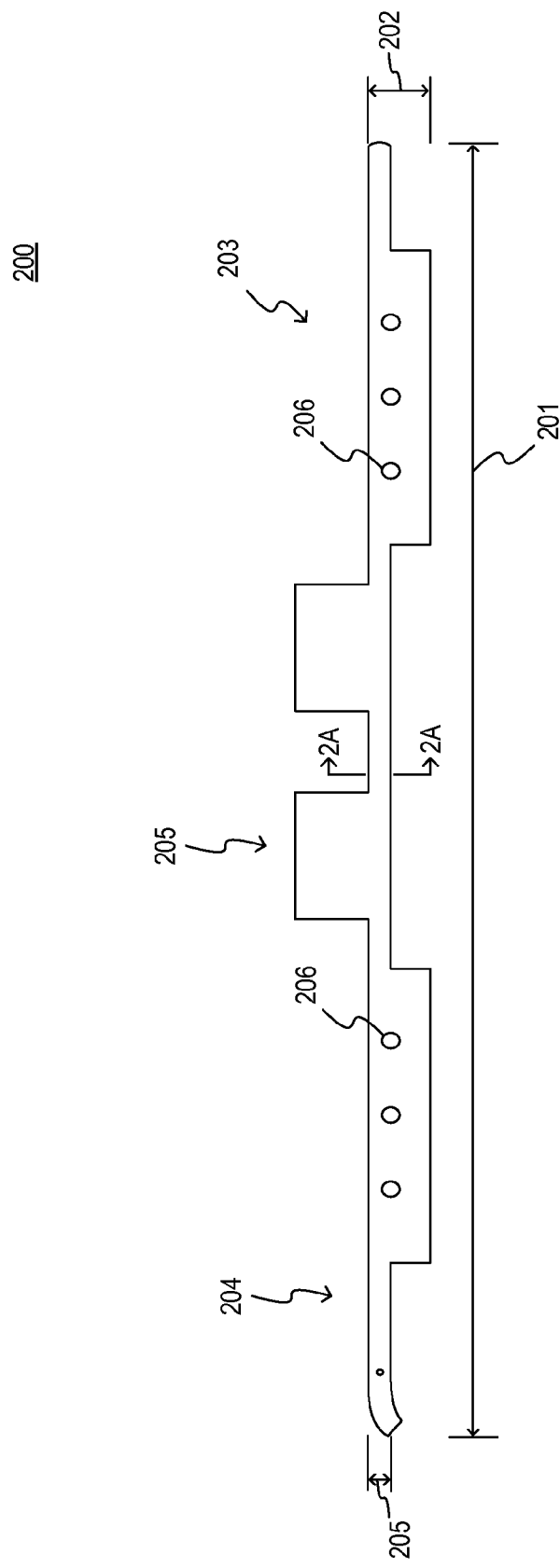

REMOVABLE ADHESIVE JOINT FOR COMPUTING DEVICE

TECHNICAL FIELD

The present disclosure relates generally to computing devices, and more specifically, to systems and methods of removably joining components of computing devices, such as joining a computer display module to an enclosure of the computing device.

BACKGROUND

Computing devices may use flat panel displays for displaying visual information to the user. The display may be a separate component, such as a computer monitor, or it may be integrated into the computing device, such as an LCD screen on a laptop computer or a display of an integrated computing device. In some cases, the LCD screen may be covered with an outer protective layer, for example glass. In recent years in particular, covering the LCD screen has gained popularity both for making the display more rugged and for stylistic reasons.

However, the presence of the additional protective cover introduces new challenges. For example, in order to access the display and/or other internal components of the device, the cover glass must be removed increasing the number of components which require removal and re-assembly. Furthermore, when accessing the display or other internal components, foreign objects or debris may be trapped between the display and cover glass. This may cause damage to the display and further result in poor user experience with the device. Some or all of the shortcoming of prior art devices of the kind may be resolved by the present disclosure

SUMMARY

Examples of computing devices according to the present disclosure may include an enclosure housing a processor and a memory device therein. The computing devices may further include an integrated display module which includes a display device and a protective cover, for example a cover glass, fixedly attached to the display device. The integrated display module in sample devices may be removably attached to the enclosure using a multilayer adhesive member as will be further described.

Multilayer adhesive members according to the present disclosure may include a first adhesive layer and a second adhesive layer disposed on opposite sides of a substrate. The substrate may be a foam layer, which may be polyurethane foam in some examples, and which may be provided on a foam carrier, for example a polyethylene terephthalate (PET) layer. Other polymers, woven, or felt materials may be used as the substrate. Adhesive members according to this disclosure may include one or more portions along the length and/or width of the adhesive members which do not include an adhesive on both sides of the substrate. That is, in some examples, an adhesive layer may be provided adjacent one side of the substrate (e.g., foam layer), while the opposite side of the substrate is substantially free of adhesive. In this manner, fouling up of surface features, which may lie in the path of the adhesive member, may be avoided.

In example adhesive members, the first and/or second adhesive layers may include two or more different types of adhesives, which may be separated by an adhesive carrier film disposed therebetween. For example, a low tack (e.g. low strength) pressure sensitive adhesive may be provided such that in use, the low tack adhesive contacts and adheres to the surfaces of the adherents. The low tack adhesive may be a removable adhesive configured to form a temporary bond with the surfaces of the respective adherents. Thus, the low tack adhesive may be peeled off of the respective surfaces without leaving residue or causing damage to the adherents. In examples, a high tack (e.g. high strength) pressure sensitive adhesive may be provided between the low tack adhesive and the substrate, for added strength of the adhesive joint. The high tack adhesive may or may not be of a removable kind. Various high strength and low strength pressure sensitive adhesives known in the art may be used, and preferably adhesives having a low coefficient of thermal expansion may be used in some examples. Furthermore, in certain examples, the carrier film between the adhesives may be omitted and the different adhesives may be layered directly on top of each other.

Examples of methods for removably mounting one computer component (e.g. a display device with a protective cover) to another (e.g. an enclosure) are also described. According to some examples, a first adhesive layer of a multilayer adhesive may be positioned along a first edge and in contact with a surface of the first computer component. The multilayer adhesive may have a first and second adhesive layers disposed on opposite sides of a substrate. A second computer component, for example the protective cover of a display device, may be contacted with the second adhesive layer to form a removable adhesive joint. In sample methods, the first adhesive layer and the second adhesive layer may include a low tack pressure sensitive adhesive, and the first and second adhesive layers may further include a high tack pressure sensitive adhesive. The low tack and high tack adhesives may be separated using a carrier layer, which may be a PET carrier film in certain embodiments. In examples according to the present disclosure, the multilayer adhesive may be configured such that the low tack adhesive is provided in contacted with a surface of the protective cover or a surface of the enclosure, and wherein the high tack adhesive is sandwiched between the low tack adhesive and the substrate. In this manner, damage to the surfaces of the adherents may be avoided as they may only be in contact with a low tack (e.g. low strength) removable adhesive.

As described further below, one advantage of the present examples may be the ability to remove and reassemble the adhesive joint with ease A method for removing a computer display according to the present disclosure may include inserting a cutting tool between the computer display and the enclosure and cutting through at least a portion of a thickness of the substrate. Various rotary cutters or other cutting implements may be used, wherein the cutting element of the rotary cutter may be made of glass or ceramic material. In further examples, the method may further include peeling off a remaining portion of the adhesive member from the surfaces of the enclosure and the display and re-applying a second adhesive member to the enclosure and/or the display to re-attach the two components together.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 2 is a plan view of an example adhesive member according to the present disclosure.

SPECIFICATION

Figure 1A:
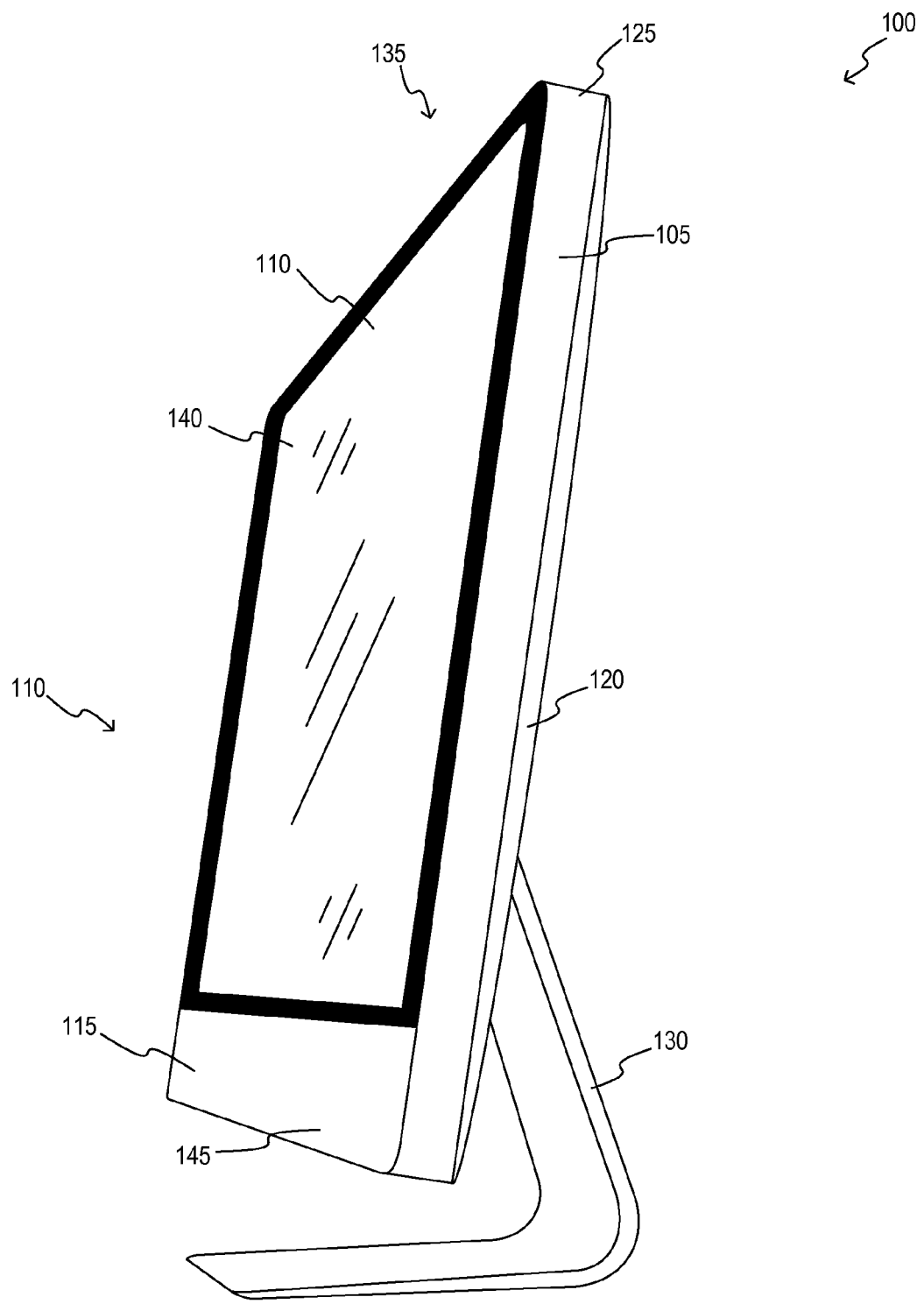
FIG. 1A is a perspective view of an integrated computing device in which the internal computer components such as a processor, memory, storage and input/output interfaces are provided within the same enclosure which encloses the display.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

The present disclosure relates to systems and methods for removably joining components of a computing device, for example joining a computer display module to an enclosure of the computer. In some examples, the internal components of the computer may be enclosed within the same enclosure as the display, as shown in FIG. 1A for example.

FIG. 1A is a perspective view of an example integrated computing device 100. The device 100 may include internal computer components known in the art, for example a processor, memory, storage, and input/output devices (not shown). The internal computer components of the device 100 may be housed within the same enclosure 105 which houses the display module 110. The internal computer components are not described herein as any of a variety of conventional components may be used and enclosed within the enclosure 105. Although FIG. 1A generally describes an integrated computing device in which certain internal computer components are enclosed within a housing along with a display screen, it should be appreciated that certain embodiments discussed herein are applicable to any display device affixed to a housing, including displays and integrated computing devices having different shapes, sizes, form factors and the like. Furthermore, the examples described herein may also be used to attach various other computer components together. For example internal components, such as circuit boards, may be attached to the enclosure or other internal structure, or two portions of the enclosure may be attached together, according to the present examples. External features may be affixed to the computing device according to the present disclosure, for example by removably adhering cover screens, skins, or other aesthetic features, to the exterior of the computing device.

In the example in FIG. 1A, the enclosure 105 of the integrated computing device 100 includes a first or front surface 115, and a second or back surface 120. A perimeter surface 125 may be defined between the front 115 and back surface 120, which may be substantially perpendicular to the front surface in some examples. In certain examples, other angular arrangements and profiles of the surfaces 115, 120 and 125 may of course be used. The surfaces 115, 120, and 125 define an interior space, within which certain components of the computing device 100 may be housed. The computing device 100 may also include a stand 130 affixed to the enclosure 105 for supporting the computing device 100 on a surface.

The enclosure 105 of the device 100 generally serves to cover and protect the internal computer components and display module 110 of the device 100. The internal components and display may be mounted to the enclosure 105 and thereby maintained in a desired relative position during use. The enclosure 105 may be made of substantially any material suitable for enclosing the internal components and supporting the weight of the components and display mounted thereto. In some examples, the enclosure 105 may be made of a metal, for example aluminum. In other examples, other metals, alloys composites, and/or plastics may be used. The enclosure 105 may be shaped as desired and/or as necessitated by various design considerations. The enclosure 105 may have one or more openings permitting access to various internal components of the computer. For example, the enclosure 105 may include one or more apertures that provide access to I/O ports and/or a power source interface, during normal use. In conventional computers, one or more access panels may also be provided in the enclosure such that internal computer components may be serviced or replaced. The enclosure 105 may have an opening 135 sized and shaped to accommodate the display module 110, with the opening 135 essentially functioning as an "access panel" for accessing certain internal components once the display is removed. Accordingly, the display module 110 may need to be removed and reassembled during the life of the device 110.

The display module 110 of the computing device 100 may be configured to display visual information thereon. The display module 110 may be implemented as one of a variety of flat panel displays, for example a liquid crystal display (LCD), a light-emitting diode (LED) display, an organic LED display, a plasma display, a cathode ray tube display, or the like. In instances where the display module 110 comprises a LCD display, the display may include various layers such a fluorescent panel, one or more polarizing filters, a layer of liquid crystal cells, a color filter, or the like (for purposes of clarity, these layers are not shown). The display module 110 of the present disclosure may further include a protective cover 140, which may be a cover glass or the like. Unlike many conventional computing devices, however, the display module 110 of the present example may be an integrated display module including a visual display device and protective cover (e.g., cover glass) 140 attached thereto, which may be integrated into a single assembly with certain operating elements of an associated computing device, such as one or more processors, buses, memory modules, storage devices, and so on. The visual display device (e.g. LCD screen and its driver circuitry) may be substantially enclosed within the interior portion of the integrated display module 110. In some examples, the integrated display module 110 may be up to about 1 inch thick, and may be 16-20 inches long and about 16-20 inches wide. The integrated display module 110 may weigh up to about 6 lbs. In some examples, the display module 110 weighs from about 3.5 to about 5.5 lbs. It should be appreciated that these measurements are meant as examples only; alternative embodiments may have different dimensions and/or weights. A sufficiently strong and stiff adhesive joint may be implemented according to the examples described, which may be adapted to support the weight of the display module 110 under any of a variety of likely loading conditions during the use of the device 100.

The computing device 100 may be configured such that access to the internal components (e.g. for service and/or replacement) may be obtained through the opening 135 which accommodates the display module 110. This may result in the removal of the display module 110 and, as such, a removable joint between the module 110 and enclosure 105 may be required.

In prior art devices of this kind, the display is typically not a unitary module in that the glass member, if present, may be separate from the back light (e.g. LCD screen). There may be numerous disadvantages of providing the glass member as a separate component. For example, one disadvantage of this arrangement is that this increases the number of components that must be removed to access the internal computer components. Another disadvantage of the cover glass being separable from the display is that the space between the glass and the backlight (e.g. the LCD screen) becomes exposed any time the computer is serviced. Foreign object debris may inevitably find their way between the glass and the LCD screen resulting in poor user satisfaction and/or damage to the LCD screen.

In the present example, and at least in part to prevent foreign materials from being trapped between the glass and the backlight, for example during servicing of the device, the display is provided as a unitary component (e.g. display module 110). That is, in examples according to the present disclosure, the backlight (not shown) and protective cover (e.g., cover glass) 140 are fixedly attached to each other. Thus, removal of the cover glass generally results in removal of the entire display from the enclosure. Providing the backlight and cover glass 140 as a single assembly, while advantageous in some respects, presents its own challenges. For example, and as previously discussed, the display 110 may need to be removed and reassembled as desired during the life of the computing device. According to the examples described, devices and methods for attaching a display in a manner which is both aesthetically pleasing and which further facilitates removal, as removal may be necessary to service the display, are described. While specific examples of removably joining a display module to an enclosure are described herein, the examples of the present disclosure may be applicable to joining a wide variety of other computer components in a removable manner. For example, certain internal computer components, such as circuitry or other hardware may be removably mounted to the enclosure 105 or other structure of the computing device 100. In other examples, certain components of mobile computing devices, such as a touch screen of a hand held device, may be removably joined to other components, such as the housing of the hand held device, according to the examples herein.

Figure 1B:
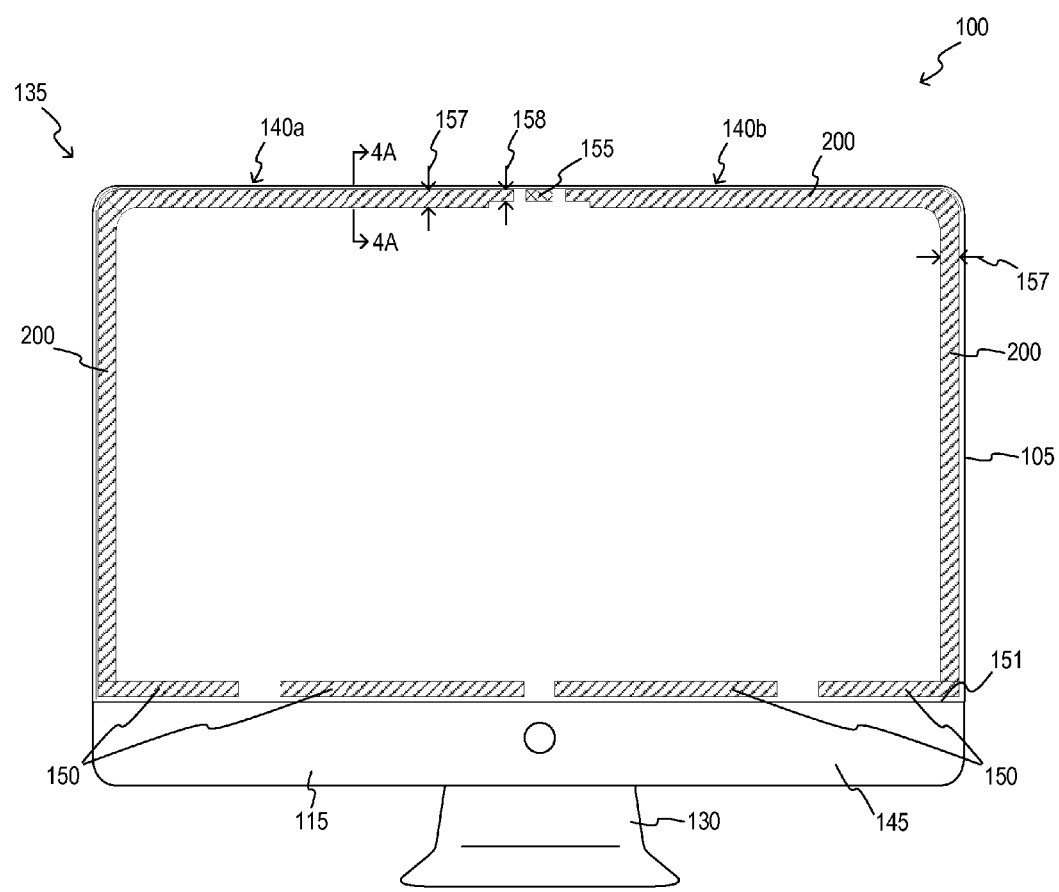
FIG. 1B is a front view of the computing device of FIG. 1A with the display module removed.

FIG. 1B shows a front view of a computing device 100 with the display module 110 removed for purposes of illustrating the location of adhesive joints according to some of the examples of the present disclosure. The enclosure 105, as described above, may have a front surface 115 with an opening 135 defined therethrough for accommodating the display module 110. The opening 135 may be shaped and sized such that a first portion of the display module (e.g. the display device) may fit therethrough, while a second portion of the display module (e.g. the perimeter of the cover glass) is placed adjacent one or more surfaces of the enclosure and is adhesively secured to the enclosure using adhesive members 200 as described herein.

One or more adhesive members 200 may be provided about the perimeter of the opening 135. In some examples, one or more adhesive members may be applied to one of more of the edges along the perimeter of the opening 135. In some examples, one ore more adhesive member 200 may be provided in the form of longitudinal strips of multilayer adhesives, which are described in further detail below. The length and/or width of the adhesive strips may vary as desired. In some examples, a plurality of strips 150 may be provided along a first length of the opening 135, for example, as shown along bottom edge 151 of the opening 135. In examples, a single strip of adhesive may span the full length of a particular edge. In some examples, the adhesive strips (e.g. adhesive member 200) may be sized and shaped to accommodate other components mounted to the enclosure. For example, a component 155 may be mounted along an edge of the opening 135 such that it lies in the path of the adhesive member 200. In such examples, a plurality of adhesive strips (e.g. adhesive strips 140a and 140b) may be applied to the enclosure around the component 155, the strips 140a, 140b being sized to define a clearing which is substantially free from adhesive. In some examples, and as will be further described, the adhesive member 200 may extend over the component 155, the adhesive member having portions along its length or width which are substantially free of adhesive. In some examples, a width 156 of the adhesive member 200 may vary along its length. The adhesive member 200 may have a first width 157 and a second width 158 which is different than the first width. Any variations of the length and width of the adhesive member 200 may be used, for example to accommodate other features along or across the path of the adhesive member 200.

FIG. 2 is a plan view of an adhesive member 200 according to some example of the present disclosure. The adhesive member 200 may have a length 201, a width 202, and a thickness (not shown in this view). The adhesive member 200 may have segments 203-205 along its length which vary in width. That is, the adhesive member 200 may include a first segment 203, which has a first width 202, and a second segment 204, which has a second width 205 different than the first width 202. The adhesive member 200 may also vary in thickness, as will be further described in reference to FIG. 3B.

As previously described, the adhesive member 200 may be configured to accommodate protrusion along the surface to which it is being mounted (e.g. the surface of the enclosure and/or cover glass). For example, the enclosure 105 may include certain components mounted thereto, which extend above the surface to which the cover glass is mounted to. The adhesive member may have features 206 configured to accommodate such protrusions. The features 206 may be circular, rectangular, or of other various shapes and may be provided substantially anywhere along the length of the adhesive member. The features 206, in some examples, may be variations in the thickness of the adhesive member, as will be described, or they may be cut-outs which extend through the full thickness of the adhesive member 200.

Figure 3A:
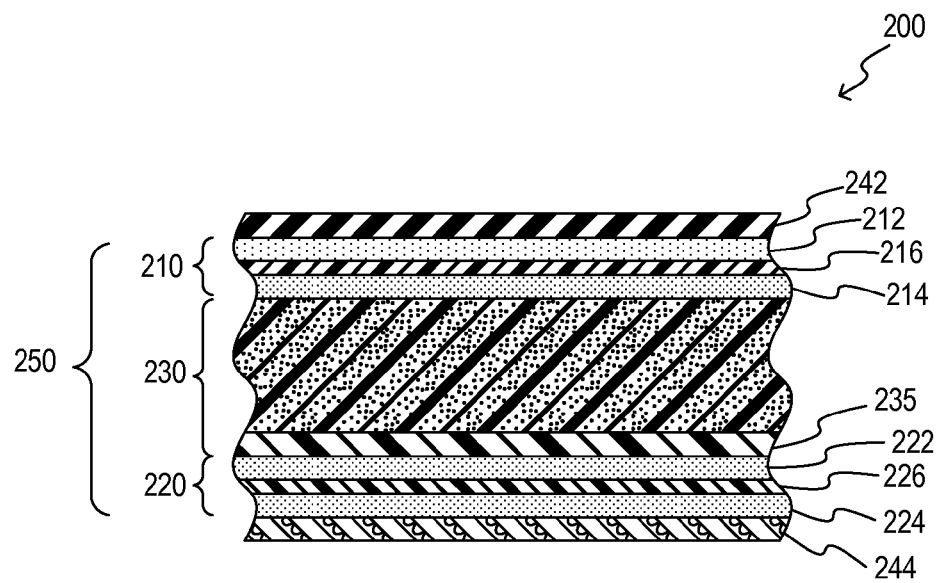
FIG. 3A is a cross-sectional view of the adhesive member of FIG. 2 taken along the line 2A-2A.

FIG. 3A shows a cross section of an adhesive member 200 prior to using the adhesive member 200 to removably attach two or more computer components together. According to some examples, the adhesive member 200 may be used to mount the display module 110 to the computer enclosure 105, which were previously described with reference to FIGS. 1A and 1B. The adhesive member 200 may be a multilayer adhesive member including a first adhesive layer 210, a second adhesive layer 220, and a substrate 230 disposed between the first 210 and second 220 adhesive layers. The substrate 230 may be a polymer foam core, such as polyethylene foam or polyurethane foam. In some examples, the substrate 230 may be provided on an PET foam carrier layer 235. Other foam layers and/or foam carriers configured to provide a desired strength and creep resistance of the adhesive joint may also be used without departing from the scope of this disclosure. In other examples, the substrate 230 may be a plastic foam layer selected from a variety of known plastic materials, including but not limited to, polypropylene, polystyrene, vinyl chloride, polyamides, and rubber latex. Other non-polymer material, for example felt materials, may also be used. The substrate 230 may serve as a carrier or a support layer for the adhesive layers, and may also serve as a sacrificial member to allow the joint to separate along its length, as will be described further below.

In some examples, each of the first and/or second adhesive layers 210, 220 may include a plurality of adhesive layers. The first adhesive layer 210 of the adhesive member 200 may include one or more layers of a removable pressure sensitive adhesive (PSA). In some examples, the first adhesive layer 210 may include a first PSA layer 212 and a second PSA layer 214. The first PSA layer 212 may be a low tack re-workable adhesive. As will be understood, a low tack adhesive is an adhesive suitable for forming a temporary (e.g. removable) joint, wherein removal of the adhesive does not damage the surface of the adherent. The second PSA layer 214 may be a high tack adhesive (e.g. high strength adhesive). The second PSA layer 214 may or may not be a removable adhesive. The first and second PSA layers 212, 214 may be separated by a carrier 216, which may be a thin film of polyethylene (PET), polyester, or other polymer material. Other non-polymer carriers may be used in some examples. In certain examples, the first PSA layer 212 may be a low tack adhesive, and the second PSA layer 214 may also be a low tack adhesive having the same or different chemical composition and properties. In other examples, the first PSA layer 212 may be a high tack adhesive, and the second PSA layer 214 may also be a high tack adhesive, which may be the same or different from the first PSA layer 212.

The adhesive member 200 may include a second adhesive layer 220 disposed adjacent the opposite side of the substrate 230, which may be a foam core or other polymer support layer in some examples. As will be understood, the term "adjacent" herein is meant to imply that the features identified are proximate one another but does not necessarily require that the features are in contact with one another. In certain embodiments according to this disclosure, adjacent components may be, at least partially, in contact with one another. The second adhesive layer 220 may include one or more layers of removable pressure sensitive adhesives, which may be the same or different than the PSAs used in the first adhesive layer 210 described above. In some examples, the second adhesive layer 220 may include a third PSA layer 222 and a fourth PSA layer 224. The third and fourth PSA layers 222, 224 may be separated using a carrier 226, which may be made of PET or polyester. Other materials may be used for the adhesive carrier 226. In some examples, the adhesive carriers 226, 216, may include polycarbonate, polyester, and/or polyvinyl chloride. In some examples, the multilayer adhesive member 200 may be configured such that the first layer of adhesive (e.g. layers 212 and 222) which is provided in contact with the adherent (e.g. the display and/or enclosure) is selected to have a strength which is lower than the strength of other adhesive layers of the multilayer adhesive. In this manner, the lower strength adhesive may facilitate removal of the adhesive member from a surface of the housing and/or display without damaging the housing and/or display. Furthermore, as will be understood, additional layers may be provided on each side of the substrate 230. That is, in some examples, each side may include more than two different adhesive layers which may allow to further tailor the performance characteristics of the adhesive member 200.

In some examples, the adhesive member 200 may include a first 242 and second 244 release liner. The first release layer 242 may be a paper liner and the second release layer 244 may be a PET liner (or vice versa). Alternately, the first and second release liners 242, 244 may both be of the same material, which may be paper or another cellulose product, or may be a polymeric material. The type of liner used may be determined based on the manufacturing processes used pre- and post-assembly of the adhesive member 200. For example, it may be desirable to cut certain features into the adhesive member 200 (e.g. via die-cutting processes). Some liners may be more suited for handing or processing the adhesive member 200 as may be desired, and accordingly, a particular liner or combinations of release liners may be used as dictated by processing considerations.

In some examples, the first adhesive layer 210 may have a thickness of about 0.05 mm to about 0.7 mm. More specifically, but not necessarily, the first adhesive layer may be approximately 0.06 mm. Likewise, the second adhesive layer 220 may have a thickness of about 0.05 mm to about 0.7 mm. In particular, but again not necessarily, the second adhesive layer 220 may be bout 0.06 mm thick. Continuing certain examples, the substrate 230 may be from about 0.2 mm to about 0.4 mm thick. In a specific embodiment, the substrate 230 may be approximately 0.3 mm thick. Thus, the overall thickness 250 the first and second adhesive layers 210, 220, and substrate 230 disposed therebetween may be may be about 0.42 mm. More particularly, in some examples the thickness 250 may be in the range of about 0.35 mm to about 0.5 mm. Other thicknesses for the various adhesives and substrates may be used as desired.

Figure 3B:
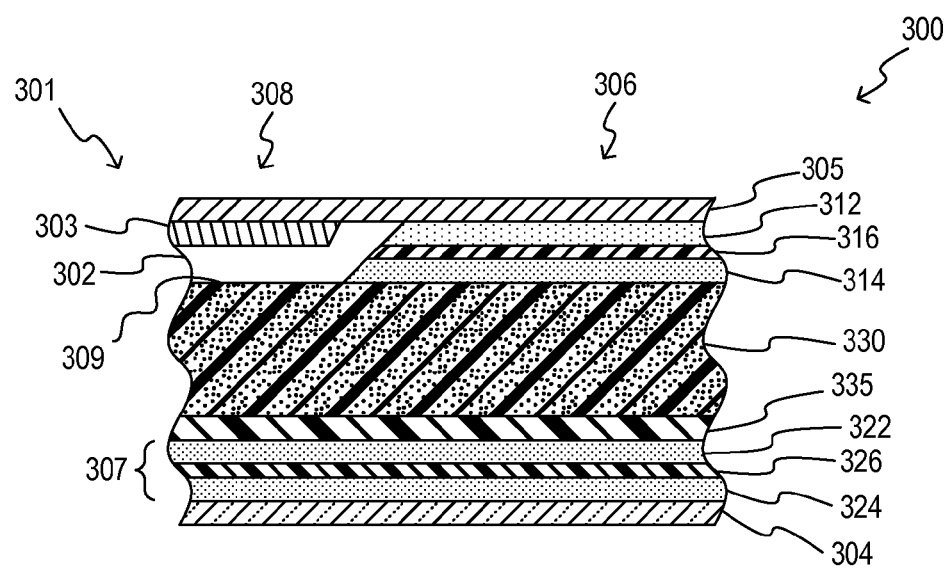
FIG. 3B is a cross-sectional view of an adhesive joint according to an example of the present disclosure.

FIG. 3B shows an example adhesive member 300 as used to attach two components together forming the adhesive joint 301. The adhesive member 300 may include some or all of the features of the adhesive member 200 described above with reference to FIG. 3A. Prior to use, the release layers of the adhesive member 300 may be removed and the adhesive member 300 applied to surfaces of the two components to form the adhesive joint 301. An adhesive joint according to this disclosure may be formed between a glass surface 304 of the display module and a surface 305 of the enclosure. As will be understood, various other components may be mounted to one another using these examples, and accordingly the adhesive joint 301 may be formed between surfaces of virtually any other computer component. The adhesive member 300 may include several features that are generally similar in structure and function to the corresponding features of the adhesive member 200 described above with reference to FIG. 3A. For example, certain portions (e.g. portion 306) along the length of the adhesive member 300 may be structurally the same or similar to the adhesive 200 previously described. That is, the first portion 306 may include one or more adhesive layers 312, 314 disposed on one side of an intermediate layer 330, which may be a foam layer. The first portion 306 may also include a second plurality of adhesive layers 322, 324 disposed on the opposite side of the intermediate layer 330 from the first plurality of adhesive layers (e.g. layers 312, 314). Some or all of the adhesive layers may be separated from each other using a carrier layer 316, 326, which may comprise a polymer film or any suitable adhesive carrier material known in the art. Also, the intermediate layer 330 may be provided on a carrier 335, which may enhance the performance (such as the tensile strength) of the intermediate layer 330. While the carrier 335 is depicted below the intermediate layer 330 in the present example, the intermediate carrier 335 may be provided on either side of the foam layer 335, in some examples. In other examples, no carrier 335 may be used, and the intermediate layer 330 may be in contact with the adhesive layers 314 and 322.

The adhesive member 300 may include other portions (e.g. portion 308) along its length which may be substantially free of adhesive on one or both sides of the intermediate layer 330. That is, the portions 308 may have an adhesive lay-up 307 on one of the sides of the intermediate layer 330, which may be substantially the same as the first or second adhesive layers of the portion 307. A discontinuity in the adhesive layer can be achieved by selectively applying adhesive to only the desired portions along the length of the adhesive member 300. Another technique for obtaining such discontinuity may be to use any of a variety of die-cutting processes to form a kiss-cut through the thickness of the adhesive on one side and up to the foam layer. In this manner, a portion of the adhesive layer on one side of the intermediate layer 330 may be removed. Selectively locating the adhesive layers along the length and/or width of the adhesive member 300 may offer numerous advantages. For example, this arrangement may advantageously provide an adhesive-free clearance for the purpose of accommodating sensitive surface features and/or other components 303 affixed to the surface 305. In some examples, no surface features and/or components may be present in the region 302 and the non-adhesive surface 309 may provided adjacent to the surface 305 or an air gap may remain therebetween.

Figure 4A:
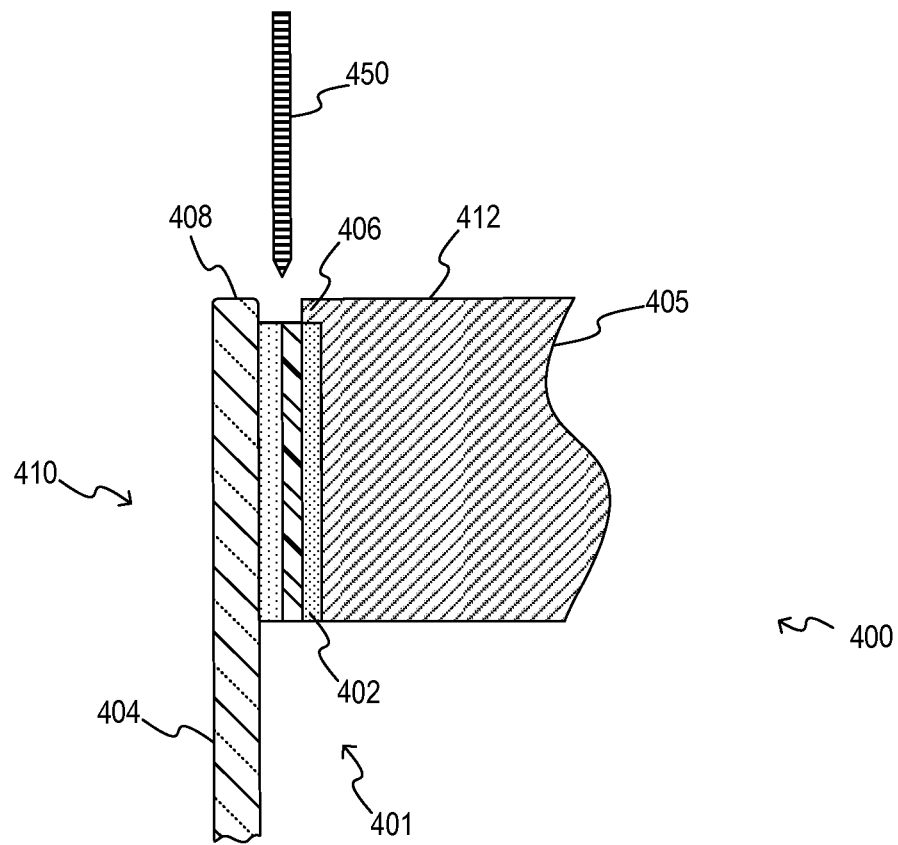
FIG. 4A is a cross-sectional view of the computing device in FIG. 1B taken along the line 4A-4A and depicting an example of an adhesive joint according to the present disclosure.
Figure 4B:
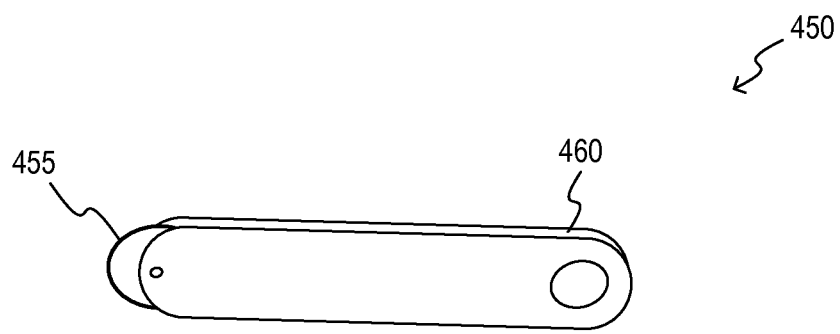
FIG. 4B is an example rotary cutting tool for removal of the display from the enclosure.

FIG. 4A shows a cross-sectional, simplified view, taken along the line 4A-4A of FIG. 1B depicting an example adhesive joint. FIG. 4B shows an example cutting tool 450 for disassembly of the adhesive joint 401 according to the examples herein. The cross-sectional view in FIG. 4A depicts a portion of a computing device 400 according to the present disclosure, including the example adhesive joint 401 between the display module 410 and the enclosure 405 of the computing device 400. The computing device 400, which may be similar to the device 100, may include one or more conventional computer components (e.g. processors, memory devices, storage devices, etc.) within the enclosure 405, the description of which will not be provided as they are well known in the art. For the purpose of illustrating certain features and relative positioning of the components of an example adhesive joint, some or all of the features depicted in the cross-sectional view of FIG. 4A, as well as other figures of the present disclosure, may or may not be to scale, as certain features may be enlarged for clarity of illustration.

Referring now to FIGS. 4A and 4B, other features of the adhesive joint and methods for disassembling the joint will be described. According to some examples, the display module 410 of the device 400 may include a cover glass 404 fixedly attached to a display device. Along at least portions of the device 400 (for example, along top and side edges of the device 100 shown in FIG. 1A), the perimeter 408 of the cover glass 404 may extend substantially to the perimeter 412 of the enclosure 405. The adhesive member 402 may be sandwiched between the surfaces of the cover glass 404 and enclosure 405. Along some portions, for example the bottom edge of the device, the perimeter of the cover glass may be adjacent to and/or supported, at least partially, by the chin 145 of the enclosure (see FIG. 1A). In some examples, and as depicted in FIG. 4A, the perimeter 412 of the enclosure may include a lip 406 and the adhesive member 402 may be provided adjacent the lip 406. The lip 406 may be configured such that the thickness of the lip 406 does not interfere with the removal of the display module 410, for example by inserting a cutting element 450 between the enclosure 405 and the cover glass 404, and as will be further described.

In some examples, the cover glass 404 may be provided with a black ink mask around the perimeter of the display module (as shown in FIG. 1A), which may be used to conceal features or components which may be located below the mask. In certain examples, and the adhesive member 402 may be configured to bond to a portion of the black ink mask. As such the adhesive joint may not visible through the front of the display because the adhesive joint may be located substantially below the mask.

The cutting tool 450 may be a rotary cutter, which may include a cutting element 455 configured to engage the adhesive joint 401. The cutting element 455 may be a blade fabricated from glass, ceramic, metal, polycarbonate, various polymers, or other suitable materials. The blade 455 may be configured to be sufficiently thin such that at least a portion of the blade 455 may be inserted between the cover glass 404 and the enclosure 405, while at the same time having the strength to cut through a substrate disposed between the adhesive layers. The adhesive joint 401 may be configured to separate along a non-adhesive portion of the joint (e.g. the foam layer) to facilitate removal of the integrated display module from the enclosure. Accordingly, one advantage of the adhesive joints described herein, as previously discussed, may be that the substrate of the adhesive member 402 may serve the dual purpose of providing the desired strength characteristics (such as tensile strength and/or creep resistance), while being a sacrificial layer which may be destroyed or severed during removal of the joint.

Figure 5:
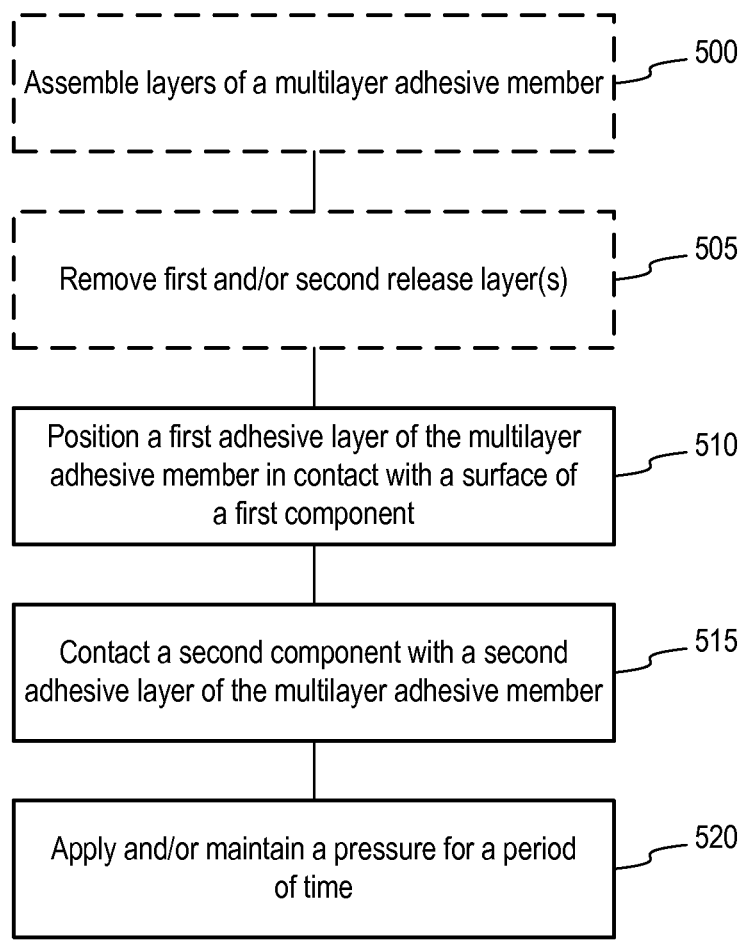
FIG. 5 is a flow diagram for assembling an adhesive member and mounting a display according to the present disclosure.

Sample methods for mounting and removing a display according to the present disclosure will now be described in further detail with reference to FIGS. 5 and 6. According to some examples, a method for removably mounting a computer display to an enclosure may include, as shown in box 510, applying a first adhesive layer in contact with a surface of a first component, which may be an enclosure. In some embodiments, additional optional steps, 500 and 505, shown in dashed lines in the figure, may be performed prior to step 510, and will be described in further detail below.

The first adhesive layer may be one of a plurality of layers of a multilayer adhesive member implemented according to any of the examples described herein, for example, the multilayer adhesive member 200 described previously. As described above, the multilayer adhesive member may include multiple layers of pressure sensitive adhesives on each side of a substrate (e.g. foam layer), which may be used to provide desired structural characteristics as well as serve as a sacrificial layer during removal.

As mentioned, an optional step for assembling components according to the present disclosure may include assembling the adhesive member, as shown in box 505. According to some examples, the assembling step may include layering a first plurality of adhesives on opposite sides of a first carrier layer, and applying the first plurality of adhesives to one side of a substrate (e.g. a foam layer). The first plurality of adhesives may be dissimilar adhesives or they may be the same type of adhesive separated into layers using the carrier film, wherein the carrier may provide additional strength and/or creep resistance. The assembling step may further include layering a second pair of adhesives on opposite sides of a second carrier layer, and applying the second plurality of adhesives to the opposite side of the substrate (e.g. foam layer). As with the first plurality of adhesives, the second plurality of adhesive may also be of the same type or they may be dissimilar. In some examples, the application of the first plurality and the second plurality of adhesives may be accomplished at the same time, or the two sides of the foam layer may be processed at different times.

In some examples, release layers may optionally be applied to the adhesive sides of the multilayer adhesive member for protecting the adhesive layers during storage and prior to application of the adhesive member to the surfaces of the enclosure and cover glass. The one or more release layers may be removed (e.g. peeled off) the multilayer adhesive prior to placing the adhesive side in contact with the surfaces of the enclosure and/or cover glass, as shown in box 500. A first release layer, which may be a paper layer, may be removed from one side of the multilayer adhesive and the adhesive member may be applied to the surface of the enclosure. A second release layer, which may be a polymer release layer, may be removed from the other side of the multilayer adhesive, exposing the opposite adhesive surface of the multilayer adhesive member. The release layers may be the same on both sides, or they may be reversed (e.g., polymer on bottom and paper on top side), in some examples.

The example method for removably mounting a computer display may further include contacting a surface of a second component, which may be a glass surface of the display module to the second adhesive layer to form an adhesive joint between the two components, as shown in box 520. In some instances, pressure may be applied for a selected period of time, as in box 530, to form a sufficiently strong bond between the parts capable of supporting the weight of the display module during various anticipated loading scenarios as will be described. In some examples, the step in box 530 may be optional, as sufficient pressure may be applied due to the weight of the component (e.g. the display). As will be understood, some or all of the steps described may be omitted or additional steps may be added when practicing the methods described. Furthermore, the steps described herein may be practiced out of sequence without departing from the scope of the present disclosure.

Figure 6:
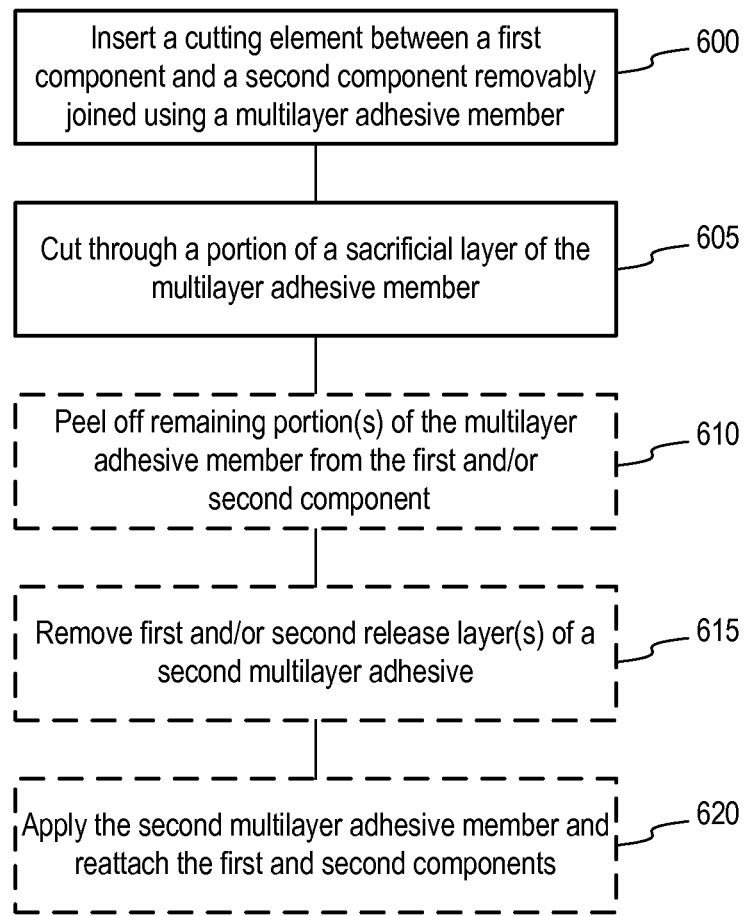
FIG. 6 is a flow diagram for removing and re-assembling a display according to examples of the present disclosure.

FIG. 6 is a flow diagram of another method according to examples of the present disclosure. As shown in box 600, a cutting element may be inserted between a first component and a second component which may be removably joined according to the examples described herein. As shown in box 605, the method may further include cutting through a portion of the substrate layer, which may serve as a sacrificial layer to allow the joint to be separated along the length of the substrate.

Referring specifically to the example of joining a display to an enclosure, the adhesive member may be provided along the edge of the enclosure and along an edge of the display (as depicted in FIGS. 4B and 4A, for example). Providing the adhesive member along the perimeter of the display may allow for ease of removal of the adhesive joint. The cutting element, an example of which is depicted in FIG. 4B, can be inserted between a portion of the computer display and a portion of an enclosure of the computer display and used to cut through at least a portion of a thickness of the foam layer. This may allow for the separation of the display from the enclosure along a non-adhesive portion of the adhesive joint. In some examples, cutting through a portion of the adhesive member may include inserting a glass or ceramic cutting element (e.g., the example cutting element 450) between the cover glass and the enclosure in order to cut the foam layer. Various other rotary or non-rotary cutters or cutting implements may be used, with the cutting element being made of any of a variety of materials, for example glass, ceramic, durable polymers, or metals.

Certain portions of the adhesive joint may not be accessible in a manner which allows a cutting tool to be inserted therethrough. For example, the bottom edge of the display module 110 in FIG. 1A may be rested on one or more surfaces of the chin 145. In this configuration, a cutting element may not be insertable between the two joined surfaces in order to cut through the adhesive member. One or more pull tabs may instead be attached along an edge of the chin to allow for removal of the display module. The pull tabs may be disposed generally perpendicular to the edge and may be accessible from the inside once the remaining sides of the adhesive joints have been cut or otherwise separated. In this way, the pull tabs may be concealed from any cosmetic sides of the device 100, and may ensure that the joint at the bottom is not accidentally compromised.

In some examples, the method may include optional steps for re-attaching the two components together. As shown in box 610, any remaining portions of the adhesive member may be peeled off from the surface of the first component (e.g. the enclosure) and/or a surface of the second component (e.g. the display). Next, a first and/or second release layer may be removed from a second adhesive member, as shown in box 615, and the second adhesive member may be applied between the surfaces of the first component and second component (e.g. enclosure and the protective cover of the display), to form a new adhesive joint between the two components.

Prior art devices may use fasteners to join various computer components, which may be particularly unsightly when joining components visible to the user of the computing device. In addition to lacking in appeal, fasteners may also increase the time and cost for assembly and disassembly of the computing device. Advantages of the present examples may include the ability to remove and rejoin components with ease and efficiency, while improving the aesthetics of the computing device. For examples, a display module adhesively joined to an enclosure as described herein may be dismounted from the enclosure and rejoined to the enclosure using minimal, if any, cleanup and preparation between the disassembly and re-assembly steps. In contrast to previously known adhesive joints, which are typically formed using permanent adhesives (e.g. epoxy), the examples described herein may allow for the adhesive joints to be removed and reassembled without causing damage to the surfaces of the adherents (e.g. surfaces of the enclosure surface and cover glass).

In the case of permanent adhesives, separation of the adhesive joint may be virtually impossible without irreversible damage to the adherents. In such examples, separation of the adhesive joint typically requires replacement of one or both of the components previously adhesively joined. In other examples, removal of the adhesive joint may be very difficult and may leave stubborn residue on the surfaces of the components (e.g. adherents) making it difficult to clean the joint surface and re-apply/re-join the components after servicing the computing device. Thus, according to the examples described herein, improved adhesive members and methods for attaching components of computing devices in a manner which is both aesthetically pleasing and which further facilitates removal and re-attachment of the display are described.

Furthermore, numerous challenges and disadvantages of adhesive joints may be overcome by the present examples. As will be appreciated, prior art adhesives of the kind suitable for creating a removable joint are generally known to have poor performance both in tension and in creep. Adhesive joints for joining computer components as may be known in the art, may not be sufficiently strong and/or durable to withstand certain loading conditions which a computing device may experience during its life.

For example, during manufacturing, the computing device may be provided in substantially any orientation and thus the joint may experience normal and shear loading along any of a variety of axes. During shipment of the product to the merchant or consumer, the device may be provided in a face-down configuration in the shipping container. Furthermore, the computing device may be handled by the user in all manner of ways (e.g., the device may be set on its side, tipped over, or the like). Thus, the adhesive member may be configured for withstanding numerous static and/or dynamic loading conditions to which the device may be subjected to during normal use or during misuse by the consumer. In some possible loading scenarios, the adhesive joint may experience large static and dynamic normal loads as the weight of the display, which may range from about 3.5 lbs up to about 6.5 lbs or more, is pulled away from the enclosure by gravity. Likewise, when the device 100 is set on its side and due to the weight of the display, the adhesive joint may experience substantial shear loads. Furthermore, vibrations may also lead to creep and failure of the adhesive joint. Accordingly, the multilayer adhesives described herein may be configured to withstand a wide range of loads being applied to a relatively large and heavy display module of the device 100. In some specific examples, but without being limited to such examples, the adhesive member may be configured to withstand shear loads and/or push through loads of up to about 6.5 lbs.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computing device comprising:
   an enclosure housing at least one computing element;
   an integrated display module comprising:
      a display device; and
      a protective cover attached to the display device;
   a multilayer adhesive member attaching the integrated display module to the enclosure around a periphery of the display device and positioned between the protective cover and the enclosure comprising:
      a foam substrate;
      a first adhesive disposed on a first side of the foam substrate and configured to detach and reattach the integrated display module from the enclosure, wherein the first adhesive has a first adhesive strength, wherein the first adhesive comprises a first pressure sensitive adhesive layer with a first adhesive strength and a second pressure sensitive adhesive layer with a second adhesive strength, wherein the second adhesive strength is greater than the first adhesive strength, and wherein the first adhesive contacts the enclosure; and
      a second adhesive formed on a second side of the foam substrate, wherein the second adhesive has a second adhesive level that is greater than the first adhesive level.

2. The computing device of claim 1, wherein the second adhesive comprises a third pressure sensitive adhesive layer with a third adhesive strength and a fourth pressure sensitive adhesive layer with a fourth adhesive strength, wherein the third adhesive strength is greater than the fourth adhesive strength, and wherein the fourth pressure sensitive adhesive layer contacts the integrated display module.

3. The computing device of claim 2, wherein at least a portion of the foam substrate is substantially free of adhesive on its second side.

4. The computing device of claim 2, wherein the foam substrate comprises polyurethane.

5. The computing device of claim 1, wherein the multilayer adhesive member is about 0.35 mm to about 0.5 mm thick.

6. The computing device of claim 1, wherein the multilayer adhesive member comprises a joint.

7. A computing device comprising:
   a display;
   an enclosure;
   a multilayer adhesive comprising:
      a substrate having a first side and a second side;
      a first adhesive layer disposed adjacent the first side of the substrate, wherein the first adhesive layer has a first adhesive strength, wherein the first adhesive layer comprises a first pressure sensitive adhesive layer and a second pressure sensitive adhesive layer, and wherein the first pressure sensitive adhesive layer has a first adhesive level and the second pressure sensitive adhesive layer has a second adhesive level that is different than the first adhesive level; and
      a second adhesive layer disposed along at least a portion of the second side of the substrate, wherein the second adhesive layer has a second adhesive strength that is greater than the first adhesive strength; wherein,
   the multilayer adhesive is configured to attach a periphery of the display to the enclosure.

8. The computing device of claim 7, wherein the first pressure sensitive adhesive layer and the second pressure sensitive adhesive layer are separated by a polymer layer.

9. The computing device of claim 7, wherein the second adhesive layer comprises a plurality of adhesive layers.

10. The computing device of claim 9, wherein the second adhesive layer comprises a third pressure sensitive adhesive layer and a fourth pressure sensitive adhesive layer.

11. The computing device of claim 10, wherein the third pressure sensitive adhesive layer has a third adhesive level and the fourth pressure sensitive adhesive layer has a fourth adhesive level that is different than the third adhesive level.

12. The computing device of claim 7, wherein a portion of the first side of the substrate is uncovered by the first adhesive layer.

13. A computing device, comprising:
- a display having a cover layer;
- a housing;
- a plurality of multilayer adhesive strips located around the periphery of the cover layer that attach the cover layer to the housing, each multilayer adhesive strip comprising:
  - a first adhesive disposed adjacent a first side of a substrate, wherein the first adhesive comprises a first pressure sensitive adhesive layer and a second pressure sensitive adhesive layer, and wherein the first pressure sensitive adhesive layer has a first adhesive strength and the second pressure sensitive adhesive layer has a second adhesive strength that is different than the first adhesive strength;
  - a carrier layer disposed adjacent a second side of the substrate; and
  - a second adhesive disposed along at least a portion of the carrier layer opposite the substrate, wherein the second adhesive is stronger than the first adhesive.

14. The computing device of claim 13, wherein the second adhesive comprises a third pressure sensitive adhesive layer with a third adhesive strength and a fourth pressure sensitive adhesive layer with a fourth adhesive strength that is different than the third adhesive strength.

* * * * *